United States Patent [19]

Watanabe et al.

[11] Patent Number: 5,777,313
[45] Date of Patent: Jul. 7, 1998

[54] OPTICAL CODE READING APPARATUS

[75] Inventors: Tohru Watanabe, Ogaki; Takashi Tanimoto, Gifu-ken, both of Japan

[73] Assignee: Sanyo Electric Co., Ltd., Osaka, Japan

[21] Appl. No.: 616,007

[22] Filed: Mar. 14, 1996

[30] Foreign Application Priority Data

Mar. 29, 1995 [JP] Japan .................................. 7-071988
Mar. 29, 1995 [JP] Japan .................................. 7-071989

[51] Int. Cl.$^6$ ............................................. G06K 7/00
[52] U.S. Cl. ............................................. 235/462
[58] Field of Search ............................. 235/462, 472

[56] References Cited

U.S. PATENT DOCUMENTS 5,576,529  11/1996  Koenck et al. ...................... 235/472

*Primary Examiner*—F. L. Evans
*Attorney, Agent, or Firm*—Armstrong, Westerman, Hattori, McLeland & Naughton

[57] ABSTRACT

An apparatus for optically reading a code pattern, made up of numerous code elements, if provided. The apparatus includes a light receiving unit, a photometer and a controller. The light receiving unit includes a plurality of first pixels, charge transfer section and a first charge converting section. The photometer includes a second pixel and a second charge converting section. The controller includes a comparator for comparing a second signal voltage to a predetermined voltage level and a clock generator for supplying a drive clock signal to the charge transfer section when the second signal voltage is greater than the predetermined voltage level. An apparatus for optically reading a combined code pattern which includes information and reference code patterns each made up of first and second code elements which are alternately mixed, is provided. The apparatus for reading a combined code pattern includes a light receiving unit, first and second sample and hold circuits and a binarizing circuit. The light receiving unit includes numerous pixels and a charge transfer section for sequentially transferring charges retained by the numerous pixels.

3 Claims, 4 Drawing Sheets

Fig. 1  PRIOR ART
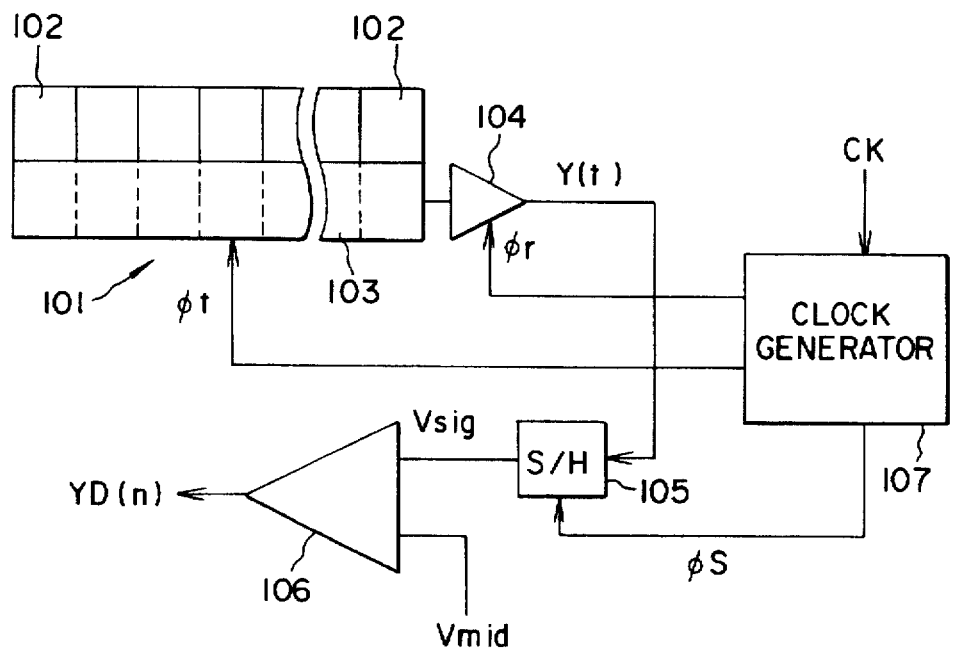
Fig. 2A PRIOR ART  $\phi t$
Fig. 2B PRIOR ART  $Y(t)$
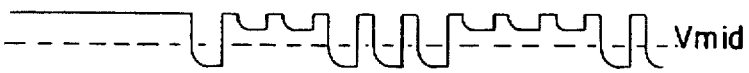
Fig. 2C PRIOR ART  $\phi S$
Fig. 2D PRIOR ART  $YD(n)$
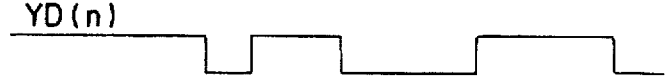

Fig. 6A  φt2
Fig. 6B  Y(t)
—Vmid
Fig. 6C  φS1
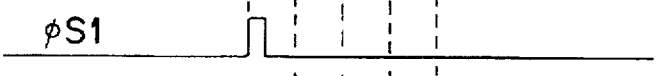
Fig. 6D  φS2
Fig. 6E  YD(n)
Fig. 7A  φt2
Fig. 7B  Y(t)
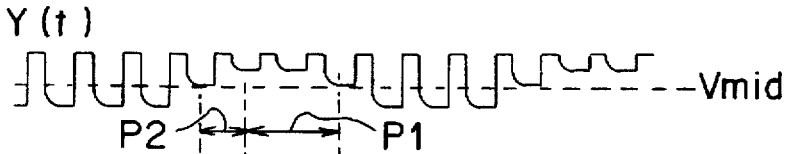
—Vmid
P2  P1
Fig. 7C  YD(n)
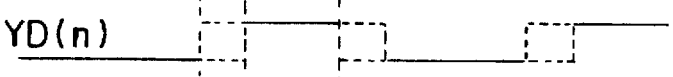
Fig. 7D  AP

OPTICAL CODE READING APPARATUS

BACKGROUND OF THE INVENTION

1. Field of the Invention

The present invention relates generally to an apparatus which optically reads a code pattern like bar codes. More particularly, this invention relates to an optical code reading apparatus which executes a stable reading operation.

2. Description of the Related Art

An apparatus that optically reads a bar code as a code pattern which has black and white pattern elements, indicative of information codes, arranged alternatively, is known. This reading apparatus receives the reflected light of light irradiated on a bar code and produces a pattern image signal of that bar code. The reading apparatus receives the pattern image signal and produces a code data signal. The produced code data signal is decoded by an image signal processor connected to the bar code reading apparatus.

FIG. 1 is a block diagram showing a bar code reader as a conventional code reading apparatus. FIG. 2 presents a waveform diagram showing signals at the individual circuits that are associated with prior art bar code reading. The bar code reader includes a line sensor 101, which has a plurality of light-receiving pixels 102 and a shift register 103, an output amplifier 104, a sample and hold circuit 105, a binarizing circuit 106 and a clock generator 107. The clock generator 107 generates a multiphase transfer clock signal $\phi_t$, a reset clock signal $\phi_r$, and a sampling clock signal $\phi_s$, the latter two being in synchronism with the transfer clock signal $\phi_t$. This clock generator 107 is also designed to start operating in response to an activation command prompts the reading of a bar code supplied from a control circuit and to stop operating when the transfer of information charges from the shift register 103 is completed.

Each light-receiving pixel 102 produces information charges in response to light reflected on a bar code and stores (or retains) the information charges. The period during which each pixel 102 receives reflected light (information-charge storing period) is previously set in accordance with the strength of light to be irradiated on a bar code. In accordance with the multiphase transfer clock signal $\phi_t$, the shift register 103 is driven to sequentially transfer the information charges stored in the individual light-receiving pixels 2 to the output amplifier 104. The output amplifier 104 converts the information charges to voltages pixel by pixel and discharges the information charges to reset the voltage values. Consequently, a pattern image signal Y(t) alternately having a voltage level and a reset level is supplied to the sample and hold circuit 105 pixel by pixel.

The sample and hold circuit 105 samples the voltage level of the pattern image signal Y(t) for one pixel in accordance with the sampling clock signal $\phi_s$, and holds the sampled signal voltage $V_{sig}$ as a voltage corresponding to the information charges. The binarizing circuit 106 compares the sampled signal voltage $V_{sig}$, held by the sample and hold circuit 105, with an intermediate voltage $V_{mid}$ between the minimum and maximum voltages of the pattern image signal Y(t), and converts the pattern image signal Y(t) to a binary code data signal YD(n) of "1" or "0". The code data signal YD(n) undergoes decoding by an unillustrated image signal processor which is connected to the bar code reader.

When the line sensor 101 in the above-described bar code reader is off the optimal position for reading the code pattern from a bar code, each light-receiving pixel cannot receive sufficient reflected light. Consequently, the code data signal YD(n) having the optimal voltage level cannot be acquired. There is a bar code reader proposed to overcome this shortcoming. This bar code reader changes the exposure time of each pixel 102 in accordance with the strength of light under feedback control to thereby alter the information-charge storing period of each pixel 102. The exposure time generally represents the time from the point when each pixel 102 has started the storage of the information charges to the point when the shift register 103 starts transferring the accumulated information charges. In the feedback control, the exposed state of each pixel 102 is detected from the level of the image signal Y(t) output from the output amplifier 104 and the exposure time of that pixel 102 is altered based on the exposed state so that the level of the image signal falls within the proper range.

This feedback control for the exposure time however requires a long time to acquire an image signal of the proper level, with the result that the bar-code reading speed decreases. To avoid the reduction in the bar-code reading speed, one may use the line sensor which includes photometric light-receiving pixels to measure the strength of light to each pixel and sets the exposure time of each pixel based on the measurement. This approach however needs a circuit associated with the measuring of the strength of light and a circuit for setting the exposure time based on the measurement acquired by the former circuit, and thus makes the overall circuit structure complicated.

The offset of the line sensor 101 to a bar code lowers the bar-code reading precision, thus making it difficult to acquire the accurate code data signal YD(n) through a binarization process. Suppose that the individual pixels receive weak reflected light from a bar code so that those pixels cannot sufficiently store information charges. In this case, the voltage value proportional to the amount of information charges, which should exceed the intermediate voltage $V_{mid}$ in the binarization process, may become equal to or lower than the intermediate voltage $V_{mid}$. This causes an error code data signal to be output. As a solution to this shortcoming, a bar code reader which clamps the level of an image signal to a reference level has been proposed. This bar code reader uses a line sensor having light-receiving pixels some of which are light-shielded, to set the levels of image signals corresponding to the light-shielded pixels to the reference level of a black pattern element. The levels of the image signals of black pattern elements, which are in the group of the image signals corresponding to the individual pixels and whose levels are equal to or lower than the reference level, are clamped to the reference level.

Because the level of an image signal of a black pattern element intrinsically includes a given offset voltage, however, level clamping may not be performed so that the black level itself exceeds the intermediate voltage $V_{mid}$. This phenomenon causes the binarizing circuit to malfunction. To prevent this malfunction, the intermediate voltage $V_{mid}$ in the binarization process may be set again in accordance with the environmental conditions at the time of reading a bar code. For example, an image signal is converted to a digital signal consisting of the proper number of bits and an intermediate value is computed from the maximum and minimum values of that digital signal to reset the intermediate voltage $V_{mid}$. In this case, the processing of image signals becomes complicated and inevitably needs a larger circuit scale.

SUMMARY OF THE INVENTION

Broadly speaking, it is an objective of the present invention to provide a code reading apparatus which executes stable code reading.

It is a further objective of the present invention to provide a code reading apparatus which acquires image signals of the proper levels.

It is still a further objective of the present invention to provide a code reading apparatus which prevents a malfunction in reading codes.

The present invention provides an apparatus for optically reading a code pattern made up of a plurality of code elements which includes a light receiving unit, a photometer and a controller. The light receiving unit receives light reflected on the code pattern to generate signal voltages. The light receiving unit includes numerous first pixels associated with the numerous code elements of the code pattern where each first pixel produces and retains charges based on light reflected on the first pixel's associated code element. The light receiving unit further includes a charge transfer section for sequentially transferring charges retained by the numerous first pixels. The light receiving unit still further includes a first charge converting section which is coupled to the charge transfer section for receiving the charges transferred from each of the first pixels to generate a first signal voltage proportioned to an amount of the charges received. The photometer detects a strength of light reflected on the code pattern and includes a second pixel arranged around the numerous first pixels for producing and retaining charges based on the light reflected on the code pattern. The photometer further includes a second charge converting section which is coupled to the second pixel for generating a second signal voltage proportional to an amount of the charges retained by the second pixel. The controller, operatively coupled to the light receiving unit and to the photometer, controls charge transfer operation of the charge transfer section. The controller includes a comparator for comparing the value of the second signal voltage with a predetermined voltage and a clock generator for supplying the drive clock signal to the charge transfer section when the second signal voltage is greater than the predetermined voltage level.

The present invention also provides an apparatus for optically reading a combined code pattern including an information code pattern and a reference pattern wherein each of the information code pattern and reference patterns consist of first and second code elements which are alternatively mixed. The apparatus for optically reading the combined code patterns includes a light receiving unit, a first and second sample and hold circuit and a binarizing circuit. The light receiving unit receives light reflected on the combined code pattern to generate a signal in accordance with the received light. The light receiving unit has a reflected light resolution to distinguish the first and second code elements of the reference pattern. The light receiving unit includes numerous pixels associated with the information code pattern and the reference pattern wherein each of the numerous pixels associated with the information code pattern are responsive to light reflected on the first and second code elements of the information code pattern for producing information charges in accordance with the first and second code elements. At least one of the pixels of the numerous pixels associated with the reference pattern is responsive to light reflected on the reference pattern for producing reference charges. The amount of reference charges produced is intermediate between the amount of information charges for each of the first code elements and the amount of information charges for each of the second code elements. The light receiving unit further includes a charge transfer section for sequentially transferring charges retained by the numerous pixels. The light receiving unit further includes a charge converting section which is coupled to output of the charge transfer section for receiving the charges transferred from each of the pixels to generate a code pattern signal. The code pattern signal is set to voltage potential level selected from a first voltage potential according to an amount of information charges for each of the second code elements and an intermediate voltage potential according to an amount of the reference charges. The first sample and hold circuit, coupled to the charge converting section, samples the code pattern signal at an intermediate voltage potential and for holding the intermediate voltage for a first predetermined period of time. The second sample and hold circuit, connected to the charge converting section, samples the code pattern signal at the first voltage potential or the second voltage potential and for alternately holding first and second voltages for a second predetermined period of time. The binarizing circuit, coupled to the first and second sample and hold circuits, compares one of the first and second voltages with the intermediate voltage and for outputting a binary data signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiment together with the accompanying drawings in which:

FIG. 1 is a block diagram showing a conventional bar code reader;

FIG. 2 is a waveform diagram showing signals at the individual circuits associated with prior art bar code reading;

FIG. 6 is a waveform diagram showing signals at the individual circuits associated with bar code reading;

FIG. 7 is a waveform diagram showing signals at the individual circuits associated with bar code reading;

FIG. 8 is a block diagram showing a binarizing circuit;

FIG. 9 is an exemplary diagram showing a bar code; and

FIG. 10 is a waveform diagram showing signals at the individual circuits associated with the reading of the bar code shown in FIG. 9.

DETAILED DESCRIPTION OF THE PREFERRED EMBODIMENTS

1. First Embodiment

Figure 3:
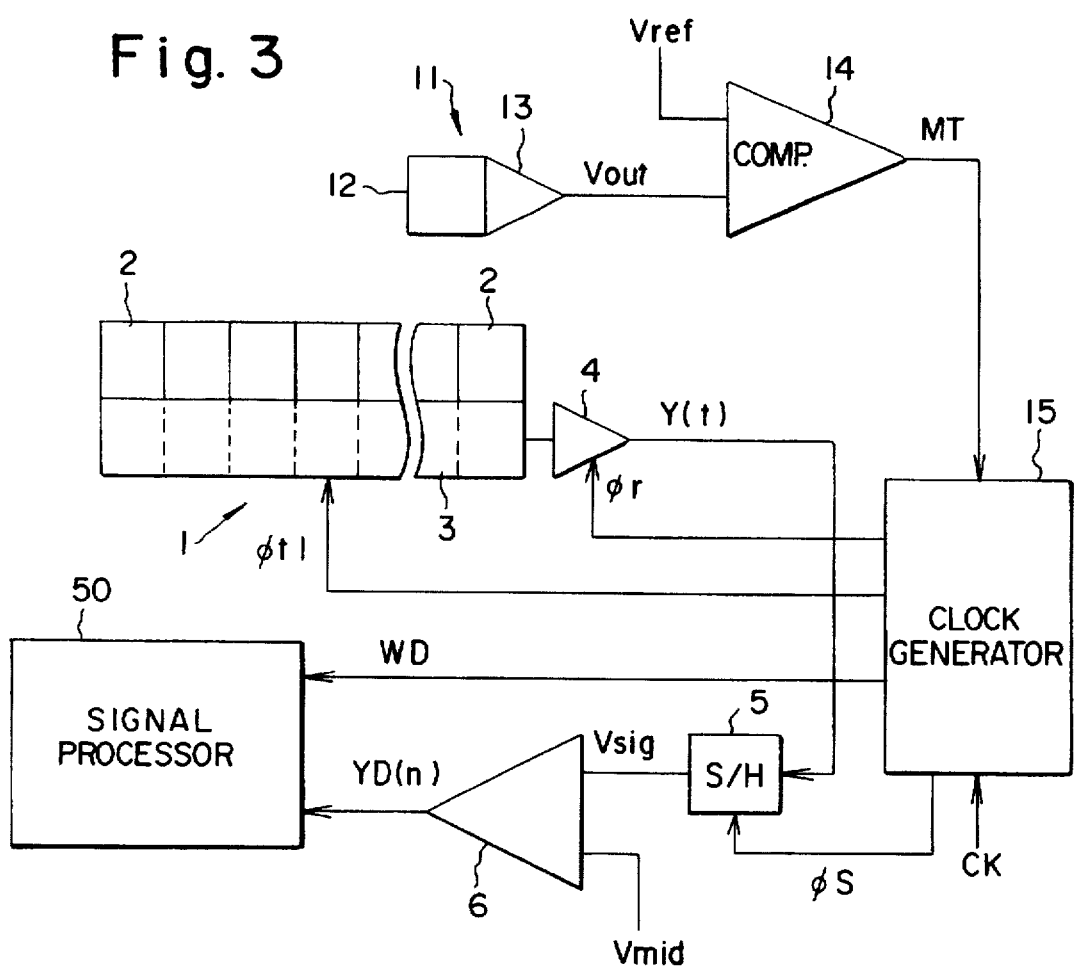
FIG. 3 is a block diagram showing a bar code reader according to the first embodiment of the present invention.
Figure 4A:
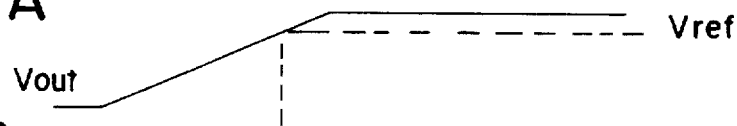
FIG. 4 is a waveform diagram showing signals at the individual circuits associated with bar code reading.
Figure 4B:
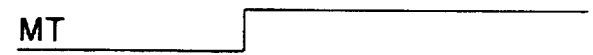
Figure 4C:
Figure 4D:

One embodiment of the present invention will now be described with reference to the accompanying drawings. FIG. 3 presents a block diagram showing a bar code reader as a code reading apparatus according to the first embodiment of the present invention. The bar code reader comprises a line sensor (or image sensor) 1, which includes numerous light-receiving pixels 2 and a shift register as a charge transfer section 3, a first output amplifier as a charge converting section 4, a sample and hold circuit 5, a binarizing circuit 6, a photometer 11, which includes a photometric light-receiving pixel 12 and a second output amplifier 13, a comparator 14 and a clock generator 15. The line sensor 1, the first output amplifier 4 and the individual circuits 5, 6, 11, 14 and 15 are integrated on a single semiconductor substrate (not shown). The line sensor 1 and the first output amplifier form a light receiving unit. According to the first embodiment, when the voltage $V_{out}$ of an output signal supplied from the photometer 11 reaches a predetermined level, the clock generator 15 is enabled to start transferring information charges stored in the individual light-receiving pixels 2.

The individual light-receiving pixels 2 are arranged in a line and their quantity and pitches are designed to be associated with bar code patterns. Each pixel 2 receives light reflected on a bar code, produces information charges in response to the reflected light and stores (or retains) the information charges. The shift register 3 is arranged in parallel to the individual pixels 2. In response to a multiphase drive clock signal $\phi_{t1}$ (which will be discussed later) supplied from the clock generator 15, this shift register 3 is driven to sequentially transfer the information charges stored in the individual light-receiving pixels 2 to the output amplifier 4 while shifting the information charges in a predetermined direction (in this case to the right).

The output amplifier 4 temporarily holds the information charges transferred from the shift register 3 and produces a voltage proportional to the amount of the held information charges. Further, the output amplifier 4 sequentially discharges the held information charges to reset the voltage value in accordance with a reset clock signal $\phi_r$ supplied from the clock generator 15. As a result, the information charges transferred from the shift register 3 are converted to voltages pixel by pixel. In this manner, the output amplifier 4 supplies a pattern image signal Y(t), which alternately has the voltage level proportional to the amount of information charges and the reset level resulting from the discharging of all the information charges, to the sample and hold circuit 5 on the pixel-by-pixel basis.

The sample and hold circuit 5 samples the voltage level of the pattern image signal Y(t) for one pixel in accordance with a sampling clock signal $\phi_s$ and holds the sampled signal voltage $V_{sig}$ as a voltage corresponding to the information charges. The binarizing circuit 6 compares the sampled signal voltage $V_{sig}$, held by the sample and hold circuit 5, with an intermediate voltage $V_{mid}$. The intermediate voltage $V_{mid}$ indicates an average intermediate value between the minimum and maximum voltages of the pattern image signal Y(t) output from the output amplifier 4. Based on the comparison result, the pattern image signal Y(t) is converted to a binary code data signal YD(n) which is represented by a binary value of "1" or "0". The code data signal YD(n) having a sequence of 1's or 0's is supplied to an image signal processor 50 for each clock period of the drive clock signal $\phi_{d}$. The code data signal YD(n) is an electric signal converted from the pattern of a bar code and undergoes decoding by the image signal processor 50.

The photometer 11, which includes the photometric light-receiving pixel (hereinafter simply called "pixel") 12 and the second output amplifier 13, is arranged adjacent to the line sensor 1, with the pixel 12 directly connected to the output amplifier 13. The pixel 12 receives light reflected on a bar code at the same time as the pixels 2 do, and stores information charges generated in response to that reflected light. The output amplifier 13 produces a voltage $V_{out}$ proportional to the amount of information charges stored in the pixel 12, and outputs the voltage signal to the comparator 14. The pixel 12 has a first diffusion layer formed on a semiconductor substrate for storing information charges. The output amplifier 13 has a second diffusion layer, which is formed on the same semiconductor substrate and is electrically isolated, and an output transistor which has a source-follower connection to acquire the potential of the second diffusion layer. According to the first embodiment, the first and second diffusion layer are shared so that the information charges generated by the pixel 12 are directly accumulated in the diffusion layer of the output amplifier 13 and the voltage $V_{out}$ proportional to the amount of the accumulated information charges is acquired as needed from the output amplifier 13. Further, the output amplifier 13 has a reset transistor which has the first diffusion layer as its source. This reset transistor serves to discharge the information charges, remaining in the diffusion layer of the pixel 12, every time the line sensor 1 and photometer 11 start storing information charges.

The comparator 14 compares the output voltage $V_{out}$ of the photometer 11 with a previously set reference voltage $V_{ref}$ and raises an activation pulse signal MT supplied to the clock generator 15 when the output voltage $V_{out}$ is greater than the reference voltage $V_{ref}$. The reference voltage $V_{ref}$ is set to a value corresponding to the output voltage $V_{out}$ that is produced as the proper amount of information charges are stored in the pixel 12. The amount of information charges produced by the pixel 12 is relatively the same as the amount of information charges produced by each pixel 2 of the line sensor 1. Therefore, the reference voltage $V_{ref}$ corresponds to the proper amount of information charges to be stored in each light-receiving pixel 2 of the line sensor 1. This property makes it possible to check the amount of information charges to be stored in the pixel 12 based on the reference voltage $V_{ref}$. It is also possible to control the amount of information charges to hold each pixel 2 in the optimal exposure state in such a way that the proper amount of information charges are stored in each pixel 2. When the proper amount of information charges are stored in each pixel 2, the clock generator 15 allows shift register 3 to be activated to perform charge transfer. This allows the pattern image signal Y(t) having the proper level to be supplied to the sample and hold circuit 5. Consequently, the accurate code data signal YD(n) can be acquired by a stable binarization process. The control of this invention can further acquire more quickly the pattern image signal Y(t) having the proper level than the conventional exposure-time feedback control, thus ensuring the improved bar-code reading speed. The control on the amount of information charges to be stored in each pixel 2 permits just enough information charges to be stored in each pixel 2, thus eliminating the need for an overflow drain for trapping excess information charges. This feature can contribute to simplifying the line sensor 1 and circuit integration. Further, the provision of the photometer 11 and comparator 14 suppresses the influence on the integration of all the circuits that are associated with bar-code reading as compared with the conventional exposure control circuit, thus making it easier to mount those circuits on a single chip.

The clock generator 15 starts operating in response to the rising of the activation pulse signal MT and produces the multiphase drive clock signal $\phi_{t1}$ in response to a reference clock signal CK of a given period. This drive clock signal $\phi_{t1}$ is supplied to the shift register 3 of the line sensor 1 while the information charges stored in the individual pixels 2 are being transferred to the output amplifier 4 by the shift register 3. At the same time, the clock generator 15 produces the reset clock signal $\phi_r$ and sampling clock signal $\phi_s$, which are synchronous with the drive clock signal $\phi_{t1}$. The reset clock signal $\phi_{r1}$ is supplied to the output amplifier 4, and the sampling clock signal $\phi_s$ to the sample and hold circuit 5.

The clock generator 15 also generates a pulse signal WD indicative of the output duration of the pattern data signal YD(n), and supplies the signal WD to the image signal processor 50. As shown in FIG. 4, the pulse signal WD falls when the supply of the drive clock signal $\phi_{t1}$, to the shift register 3 starts, and rises when the supply of this signal $\phi_{t1}$ ends. In other words, the pulse signal WD falls when the transfer of the information charges stored in the individual pixels 2 starts, and rises when this charge transfer ends. The clock generator 15 controls the line sensor 1 and the photometer 11 in such a way that those components are reset before starting receiving reflected light. After the reset operation is completed, the drive clock signal $\phi_{t1}$ is supplied in response to the activation pulse signal MT. The information charges stored in the pixels 2 and the pixel 12 may be acquired directly from the pixels 2 and 12 to initialize the line sensor 1 and the photometer 11, without activating the first and second output amplifiers 4 and 14. Further, a drain for discharging charges may be used to trap information charges.

2. Second Embodiment

Figure 5A:
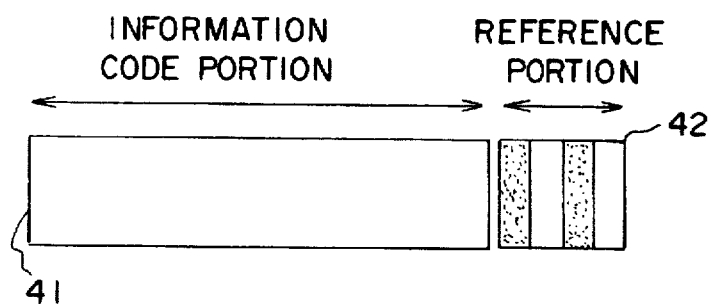
FIG. 5A is an exemplary diagram showing a bar code according to the second embodiment of this invention.
Figure 5B:
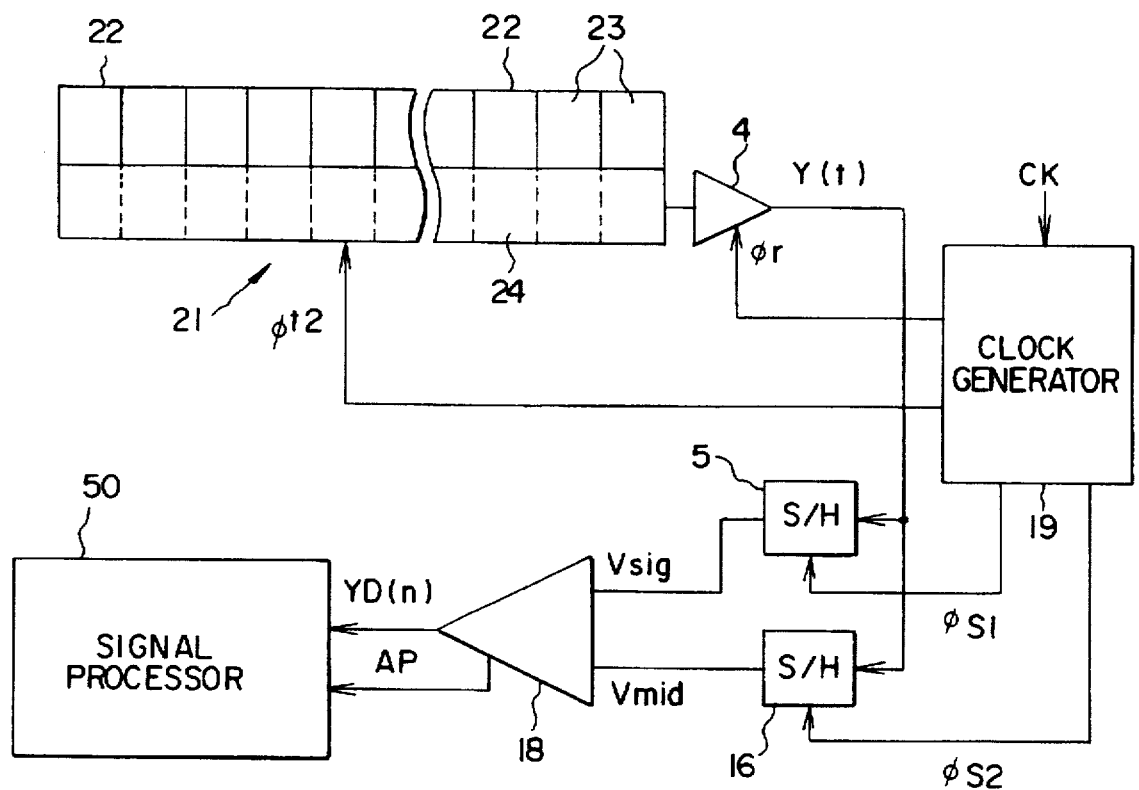
FIG. 5B is a block diagram showing a bar code reader according to the second embodiment.

To avoid a redundant description, like or same reference numerals are given to those components which are the same as the corresponding components of the first embodiment. FIG. 5B presents a block diagram showing a bar code reader according to the second embodiment. This bar code reader comprises a line sensor 21 as a light receiving unit, an output amplifier 4, first and second sample and hold circuits 5 and 16, a binarizing circuit 18 and a clock generator 19. The line sensor 21 includes a plurality of first and second light-receiving pixels 22 and 23 each group arranged in a line, and a shift register 21. As shown in FIG. 5A, a bar code in the second embodiment consists of an information code portion 41 and a reference portion 42. In accordance with this structure, the first light-receiving pixels 22 are used to read the information code portion 41, and the second light-receiving pixels 23 are used to read the reference portion 42.

The information code portion 41 has alternately arranged white and black pattern elements indicative of information codes. The individual pattern elements are so laid out as to be sufficiently read with the resolving power (or resolution) of the line sensor 21. More specifically, the individual pattern elements are so laid out as to be sufficiently larger than the Nyquist limitation of the line sensor 21. In other words, the line sensor 21 has a reflected light resolution to distinguish white and black pattern elements of the information code portion 41. For example, four first pixels 22 are associated with a single pattern element so that those four pixels 22 can be responsive to light reflected on one pattern element. Accordingly, information charges corresponding to a white or black pattern element are stored in each first pixel 22.

In the reference portion 42, white and black pattern elements, each having such a size that the Nyquist limitation of the line sensor 21 becomes a half or smaller, are alternately arranged. That is, the individual pattern elements are laid out with a density exceeding the resolving power of the line sensor 21. In other words, the line sensor 21 can not distinguish the white and black pattern elements of the reference portion. For example, a single second pixel 23 is associated with a single white and black pattern elements so that one pixel 23 can produce reference charges, the amount of which is intermediate between an amount of information charges for each of the white pattern elements and an amount of information charges for each of the black pattern elements. Accordingly, intermediate charges corresponding to the white and black pattern elements are stored in each second pixel 23 as reference charges. A voltage corresponding to the reference charges that are transferred from each second pixel 23 is used as the reference (or intermediate) voltage $V_{mid}$ in the binarization process.

In response to a multiphase transfer clock signal $\phi_{t1}$ from the clock generator 19, the shift register 24, arranged in parallel to the first and second pixels 22 and 23, is transferred to sequentially output the information charges stored in the first and second pixels 22 and 23. The first and second pixels 22 and 23, the information code portion 41 and the reference portion 42 are so designed that the information charges of each second pixel 23 are transferred before the information charges of each first pixel 22. The output amplifier 4 produces a pattern image signal Y(t) in the same manner as done in the first embodiment, and supplies this signal Y(t) to the first and second sample and hold circuits 5 and 16. The pattern image signal Y(t) has a high-level voltage indicative of a white pattern element and a low-level voltage indicative of a black pattern element. Those two voltages correspond to the information charges stored in the first pixels 22. The pattern image signal Y(t) also has an intermediate voltage which is the average of the voltage for a white pattern element and the voltage for a black pattern element. This intermediate voltage corresponds to the information charges stored in the second pixels 23.

The clock generator 19 produces the multiphase transfer clock signal $\phi_{t2}$, a reset clock signal $\phi_r$, and first and second sampling clock signals $\phi_{s1}$ and $\phi_{s2}$, the latter three being synchronous with the transfer clock signal $\phi_{t2}$, based on the clock signal CK. The reset clock signal $\phi_r$ is supplied to the output amplifier 4. The first sampling clock signal $\phi_{s1}$ is synchronized with the continuous transfer of the information charges of the individual first pixels 22 after the transfer of the information charges of the second pixels 23, as shown in FIG. 6, and it is supplied to the first sample and hold circuit 5. The second sampling clock signal $\phi_{s2}$ is synchronized with the transfer of the information charges of the individual second pixels 23, and it is supplied to the second sample and hold circuit 16. Accordingly, the transfer of the information charges of the line sensor 21 is synchronized with the sampling of the pattern image signal Y(t) by the first and second sample and hold circuits 5 and 16.

The second sample and hold circuit 16 samples the pattern image signal Y(t) in accordance with the second sampling clock signal $\phi_{s2}$ and holds the sampled voltage level. The held voltage is an intermediate voltage which is the average of the voltages of white and black pattern elements, and this intermediate voltage is supplied as the reference voltage $V_{mid}$ to the binarizing circuit 18 from the second sample and hold circuit 16. The first sample and hold circuit 5 continuously samples the pattern image signal Y(t) in accordance with the first sampling clock signal $\phi_{s1}$ and sequentially holds the individual sampled voltage levels. The held voltages are those indicative of a white or black pattern element, and they are supplied as a signal voltage $V_{sig}$ to the binarizing circuit 18 from the first sample and hold circuit 5.

The binarizing circuit 18 compares the held intermediate voltage $V_{mid}$ with each signal voltage $V_{sig}$ and converts the pattern image signal Y(t) to a code data signal YD(n) represented by a binary value of "1" or "0". It is apparent from the above that the intermediate voltage $V_{mid}$ indicates an intermediate level which is approximately the average of the minimum level and maximum level of the signal voltage $V_{sig}$, regardless of the light-receiving state of the line sensor 21. When the signal voltage $V_{sig}$ of the pattern image signal Y(t) changes due to a change in the light-receiving state of the line sensor 21, therefore, the intermediate voltage $V_{mid}$ varies accordingly. This can permit the binarizing circuit 18 to perform the accurate and stable comparison and determination process, thus improving the reliability of the code data signal YD(n).

The binarizing circuit 18 also compares the signal voltage $V_{sig}$ with a first reference voltage $V_{mid}+\Delta V$, obtained by adding a given value to the reference voltage $V_{mid}$, and a second reference voltage $V_{mid}-\Delta V$, obtained by subtracting the given value from the reference voltage $V_{mid}$. When both comparison results coincide with each other, i.e., when the signal voltage $V_{sig}$ is higher than the first reference voltage $V_{mid}+\Delta V$ or lower than the second reference voltage $V_{mid}-\Delta V$, the code data signal YD(n) is established. This is because the signal voltage $V_{sig}$ indicates a value close to the intermediate voltage $V_{mid}$ when a single first pixel 22 scans the boundary portion between a white pattern element and a black pattern element. When the code data signal YD(n) changes to "1" from "0" or changes to "0" from "1" as shown in FIG. 7, for example, the signal voltage $V_{sig}$ temporarily becomes close to the intermediate voltage $V_{mid}$. At this time, it is difficult to acquire the correct comparison result.

FIG. 8 is a block diagram showing the binarizing circuit 18. The binarizing circuit 18 has first and second offset circuits 31 and 32, first and second comparators 33 and 34 and a determining circuit 35. The first offset circuit 31 adds a given voltage $\Delta V$ to the intermediate voltage $V_{mid}$ and supplies the resultant voltage as the first reference voltage $V_{mid}+\Delta V$ to the first comparator 33. The second offset circuit 32 subtracts the given voltage $\Delta V$ from the intermediate voltage $V_{mid}$ and supplies the resultant voltage as the second reference voltage $V_{mid}-\Delta V$ to the second comparator 34. The first comparator 33 compares the first reference voltage $V_{mid}+\Delta V$ with the signal voltage $V_{sig}$ and supplies the first comparison result to the determining circuit 35. The second comparator 34 compares the second reference voltage $V_{mid}-\Delta V$ with the signal voltage $V_{sig}$ and supplies this second comparison result to the determining circuit 35.

The determining circuit 35 determines if the first and second comparison results coincide with each other. When both comparison results coincide with each other, the signal voltage $V_{sig}$ is higher than the first reference voltage $V_{mid}+\Delta V$ or lower than the second reference voltage $V_{mid}-\Delta V$. In this case, the determining circuit 35 outputs the code data signal YD(n) of "1" or "0". When both comparison results do not coincide with each other, the signal voltage $V_{sig}$ falls within the range between the first reference voltage $V_{mid}+\Delta V$ and the second reference voltage $V_{mid}-\Delta V$. In this case, the determining circuit 35 keeps outputting the code data signal YD(n) that has been already established. This feature ensures the accurate and stable comparison process of the binarizing circuit 18 when the level of the code data signal YD(n) varies, thus further improving the reliability of the code data signal YD(n). It is also possible to prevent the first and second comparators 33 and 34 from chattering, thus suppressing the occurrence of noise and reducing the consumed power of the overall circuit.

To indicate the duration in which the accurate code data signal YD(n) is output, the determining circuit 35 further produces a period indication pulse signal AP as shown in FIG. 7 and supplies this pulse signal AP together with the code data signal YD(n) to the image signal processor 50. The period indicating pulse signal AP maintains a low level in a period P1 where the first and second comparison results match with each other, and maintains a high level in a period P2 where both comparison results do not match with each other. Accordingly, the image signal processor 50 can easily determine the timing at which the correct code data signal YD(n) should be received, in accordance with the period indicating pulse signal AP. That is, the image signal processor 50 can receive the code data signal YD(n) in the period P1 where data is stable.

According to the second embodiment, the pattern image signal Y(t) of the reference portion 42 is held at the intermediate voltage $V_{mid}$, after which the pattern image signal Y(t) of the information code portion 41 is held at the signal voltage $V_{sig}$. This scheme ensures easy detection of the position of an information code in the code data signal YD(n). Assume that a bar code consists of a reference portion 60, an information code portion 61 and a white code portion 52, as shown in FIG. 9. Also suppose that the line sensor 21 has read the entire information code portion 61 and parts of the reference portions 60 and white code portions 62, using this bar code. In this case, the pattern image signal Y(t) is represented by the reference level, the information code and the white level in the named order in accordance with the transfer clock signal $\phi_t$. When the reference voltage corresponding to the head pattern of the reference portion 60 is supplied as the intermediate voltage $V_{mid}$ to the first and second offset circuits 31 and 32, this reference voltage is supplied as the signal voltage $V_{sig}$ to the first and second comparators 33 and 34. During the supply of this signal voltage $V_{sig}$, the determining circuit 35 cannot establish the level of the code data signal YD(n). As a result, the period indicating pulse signal AP maintains a high level as shown in FIG. 10. When the signal voltage $V_{sig}$ of the information code level is supplied to the first and second comparators 33 and 34 later, the determining circuit 35 establishes the level of the code data signal YD(n) and causes the period indicating pulse signal AP to fall. Therefore, the head position of the information code in the code data signal YD(n) is easily detected by the first falling of the period indicating pulse signal AP.

Although only two embodiments of the present invention have been described herein, it should be apparent to those skilled in the art that the present invention may be embodied in many other specific forms without departing from the spirit or scope of the invention. Particularly, it should be understood that the invention may be adapted for the case where a code pattern like a bar code is arranged in a two-dimensional form and the image sensor has a plurality of light-receiving pixels arranged in a matrix form (two-dimensionally).

Therefore, the present examples and embodiments are to be considered as illustrative and not restrictive and the invention is not to be limited to the details given herein, but may be modified within the scope of the appended claims.

What is claimed is:

1. An apparatus for optically reading a code pattern consisting of a plurality of code elements, said apparatus comprising:

A) a light receiving unit for receiving light reflected on said code pattern to generate signal voltages, said light receiving unit including:

a plurality of first pixels associated with said plurality of code elements of said code pattern, each first pixel producing and retaining charges based on light reflected on said first pixel's associated code element, a charge transfer section for sequentially transferring charges retained by said plurality of first pixels, and a first charge converting section, coupled to output of said charge transfer section, for receiving said charges transferred from each of said first pixels to generate a first signal voltage proportional to an amount of said charges received;

B) a photometer for detecting a strength of said light reflected on said code pattern, said photometer including:

a second pixel, arranged adjacent to said plurality of first pixels, for producing and retaining charges based on said light reflected on said code pattern, and a second charge converting section, coupled to said second pixel, for generating a second signal voltage proportional to an amount of said charges retained by said second pixel; and C) a controller, operatively coupled to said light receiving unit and to said photometer, for controlling charge transfer operation of said charge transfer section, said controller including:

a comparator for comparing said value of said second signal voltage with a predetermined voltage level, and clock generator, coupled to said charge transfer section, for supplying a drive clock signal to said charge transfer section when said comparator determines that said second signal voltage is greater than said predetermined voltage level.

2. The apparatus according to claim 1, wherein said controller produces said drive clock signal for allowing said charge transfer section to perform charge transfer and a pulse signal indicative of a transfer period for charges retained by said plurality of first pixels.

3. The apparatus according to claim 1, further comprising:

a binarizing circuit, coupled to said first charge converting section, for comparing said first signal voltage with a preset reference voltage and for outputting a binary code data signal based on a comparison result.

* * * * *